(12) United States Patent
Gavillet et al.

(10) Patent No.: US 8,915,177 B2
(45) Date of Patent: Dec. 23, 2014

(54) BEVERAGE MACHINE WITH CARRYING HANDLE AND CONFIGURABLE APPEARANCE AND SIDE FUNCTIONS

(75) Inventors: Gilles Gavillet, Ursy (CH); Alexandre Kollep, Lutry (CH); Peter Möri, Walperswil (CH); Renzo Moser, Gümmenen (CH); Frank Schnyder, Mont-Pèlerin (CH); Alfred Yoakim, St.-Legier-La Chiesaz (CH)

(73) Assignee: Nestec S.A., Vevey (CH)

( * ) Notice: Subject to any disclaimer, the term of this patent is extended or adjusted under 35 U.S.C. 154(b) by 472 days.

(21) Appl. No.: 13/055,355

(22) PCT Filed: Mar. 17, 2009

(86) PCT No.: PCT/EP2009/053139
§ 371 (c)(1),
(2), (4) Date: Jan. 21, 2011

(87) PCT Pub. No.: WO2010/015427
PCT Pub. Date: Feb. 11, 2010

(65) Prior Publication Data
US 2011/0126717 A1   Jun. 2, 2011

(30) Foreign Application Priority Data

Aug. 8, 2008  (WO) ................. PCT/EP2008/060463
Oct. 23, 2008 (EP) .................................... 08167421

(51) Int. Cl.
| A47J 31/44 | (2006.01) |
| A47J 31/00 | (2006.01) |
| A47J 31/40 | (2006.01) |
| A47J 31/46 | (2006.01) |
| A47J 31/36 | (2006.01) |
| A47J 31/52 | (2006.01) |

(52) U.S. Cl.
CPC .............. *A47J 31/52* (2013.01); *A47J 31/3623* (2013.01); *A47J 31/4407* (2013.01); *A47J 31/3676* (2013.01); *A47J 31/4417* (2013.01)

USPC .......................... 99/289 R; 99/295; 99/302 R (58) Field of Classification Search
CPC ... A47J 31/3623; A47J 31/3676; A47J 31/52; A47J 31/4417; A47J 31/4407
USPC ............ 99/275, 495, 279–307, 323, 516, 536
See application file for complete search history.

(56) References Cited

U.S. PATENT DOCUMENTS

| 1,437,005 A | 11/1922 | Newsom |
| 1,513,685 A | 10/1924 | Ardovino |

(Continued)

FOREIGN PATENT DOCUMENTS

| CA | 2656200 | 1/2008 |
| CH | 503630 | 2/1971 |

(Continued)

OTHER PUBLICATIONS

International Search Report, PCT/EP2009/053139, mailed Jul. 20, 2009.

(Continued)

*Primary Examiner* — Jianying Atkisson
(74) *Attorney, Agent, or Firm* — Winston & Strawn LLP (57) ABSTRACT

A machine for preparing a beverage having a main body containing a brewing unit and a handle movable relative to the main body, so as to act on the brewing unit to open the brewing unit for introduction or removal of an ingredient into and from the unit, and act to close the brewing unit for extraction of such ingredient within the unit. The movable handle has a gripping part and is arranged to be drivable by a human hand. The main body and the movable handle are so connected and configured that the gripping part has a carrying position in which the gripping part is seizable by the human hand for safe lifting and single-handed displacing of the machine.

20 Claims, 4 Drawing Sheets

(56) References Cited

U.S. PATENT DOCUMENTS

| | | | |
|---|---|---|---|
| 2,514,360 A | 7/1950 | Alvarez | 392/465 |
| 2,715,868 A | 8/1955 | Brown | 99/302 R |
| 3,260,190 A | 7/1966 | Levinson | 99/295 |
| 3,286,618 A | 11/1966 | Barrera | 99/302 |
| 3,320,572 A | 5/1967 | Schwartz | 439/80 |
| 3,374,979 A | 3/1968 | Coldren et al. | 248/222.12 |
| 3,622,750 A | 11/1971 | Watts, Jr. | |
| 3,919,520 A | 11/1975 | Pickard | 219/208 |
| 4,242,568 A | 12/1980 | Wunderlin et al. | 392/397 |
| 4,320,626 A | 3/1982 | Donnelly | 62/3 |
| 4,551,611 A | 11/1985 | Longo | 392/451 |
| 4,589,374 A | 5/1986 | Farina | 122/18.31 |
| 4,595,131 A | 6/1986 | Ruskin et al. | 222/640 |
| 4,760,774 A | 8/1988 | Lin | 99/299 |
| 4,871,089 A | 10/1989 | Rader et al. | 222/54 |
| 4,949,627 A | 8/1990 | Nordskog | 99/281 |
| 5,019,690 A | 5/1991 | Knepler | 219/490 |
| 5,063,836 A | 11/1991 | Patel | 99/281 |
| 5,161,455 A * | 11/1992 | Anson et al. | 99/280 |
| 5,257,341 A | 10/1993 | Austin, Jr. et al. | 392/487 |
| 5,392,694 A | 2/1995 | Muller et al. | 99/295 |
| 5,531,152 A | 7/1996 | Gardosi | 99/289 R |
| 5,709,574 A | 1/1998 | Bianca et al. | |
| 5,755,149 A | 5/1998 | Blanc et al. | 99/289 |
| 5,776,527 A | 7/1998 | Blanc | 426/77 |
| 5,794,519 A | 8/1998 | Fischer | 99/295 |
| 5,836,236 A | 11/1998 | Rolfes et al. | 99/290 |
| 5,855,161 A | 1/1999 | Cortese | |
| 5,901,636 A | 5/1999 | Witziers et al. | |
| 5,943,472 A | 8/1999 | Charles et al. | 392/396 |
| 5,957,033 A | 9/1999 | In-Albon | |
| 5,992,298 A | 11/1999 | Illy et al. | 99/281 |
| 6,009,792 A | 1/2000 | Kraan | |
| 6,025,000 A | 2/2000 | Fond et al. | |
| 6,026,732 A | 2/2000 | Kollep et al. | |
| 6,032,481 A | 3/2000 | Mosby | 62/457.2 |
| 6,035,762 A | 3/2000 | Ruckstuhl | |
| 6,036,530 A | 3/2000 | Edwards et al. | 439/455 |
| 6,062,732 A | 5/2000 | Scott | 383/24 |
| 6,098,525 A | 8/2000 | Gijzel et al. | 99/282 |
| 6,389,226 B1 | 5/2002 | Neale et al. | 392/485 |
| 6,393,967 B2 | 5/2002 | Fischer | 99/285 |
| 6,453,800 B1 | 9/2002 | Chen | 99/289 |
| 6,554,588 B1 | 4/2003 | DiBenedetto | 417/417 |
| 6,698,332 B2 | 3/2004 | Kollep et al. | |
| 6,748,850 B1 | 6/2004 | Kraan | |
| 6,889,598 B2 | 5/2005 | Wroblewski | 99/275 |
| 6,954,973 B2 | 10/2005 | Zirbis | |
| 6,966,251 B2 | 11/2005 | Yoakim | 99/295 |
| 6,994,015 B2 | 2/2006 | Bruinsma | |
| 7,017,474 B2 | 3/2006 | Comte | |
| 7,077,053 B2 | 7/2006 | Kraan | |
| 7,131,369 B2 | 11/2006 | Gantt et al. | 99/289 R |
| 7,165,488 B2 | 1/2007 | Bragg et al. | 99/295 |
| 7,231,869 B2 | 6/2007 | Halliday et al. | |
| 7,286,752 B2 | 10/2007 | Gourand | 392/479 |
| 7,287,461 B2 | 10/2007 | Halliday et al. | |
| 7,316,178 B2 | 1/2008 | Halliday et al. | |
| 7,383,763 B2 | 6/2008 | Dijs | |
| 7,418,899 B2 | 9/2008 | Halliday et al. | |
| 7,444,927 B1 * | 11/2008 | Crosville et al. | 99/295 |
| 7,562,618 B2 | 7/2009 | Jarisch et al. | |
| 7,569,243 B2 | 8/2009 | Yoakim et al. | |
| 7,703,380 B2 | 4/2010 | Ryser et al. | 99/295 |
| 7,740,511 B2 | 6/2010 | Katano | |
| 7,959,090 B2 | 6/2011 | Shank et al. | |
| 2002/0148357 A1 | 10/2002 | Lazaris et al. | 99/295 |
| 2003/0019367 A1 | 1/2003 | Fogagnolo et al. | 99/330 |
| 2003/0047080 A1 | 3/2003 | Wu | 99/279 |
| 2003/0066431 A1 | 4/2003 | Fanzuitti et al. | 99/279 |
| 2004/0031394 A1 | 2/2004 | Yoakim et al. | 99/279 |
| 2004/0101293 A1 | 5/2004 | Bissonnette et al. | 392/484 |
| 2004/0250686 A1 | 12/2004 | Hale | 99/295 |
| 2004/0264951 A1 | 12/2004 | Kuebler et al. | |
| 2005/0106288 A1 | 5/2005 | Blanc et al. | 426/77 |
| 2005/0107919 A1 | 5/2005 | Watanabe et al. | |
| 2005/0183578 A1 | 8/2005 | Mandralis et al. | |
| 2005/0235834 A1 | 10/2005 | Blanc et al. | 99/279 |
| 2006/0102008 A1 | 5/2006 | Lin | 99/279 |
| 2007/0012685 A1 | 1/2007 | Gourand | 219/628 |
| 2007/0044664 A1 | 3/2007 | Wang | 99/279 |
| 2007/0104837 A1 | 5/2007 | Yoakim et al. | 426/77 |
| 2008/0006159 A1 | 1/2008 | Fischer | 99/289 R |
| 2008/0028947 A1 | 2/2008 | Magg et al. | 99/288 |
| 2008/0090473 A1 | 4/2008 | Katano | |
| 2008/0203870 A1 * | 8/2008 | Riley et al. | 312/265.6 |
| 2008/0236403 A1 | 10/2008 | Cortese | 99/323 |
| 2008/0273868 A1 | 11/2008 | Boussemart et al. | 392/479 |
| 2009/0154909 A1 | 6/2009 | Meyer | 392/473 |
| 2009/0205503 A1 | 8/2009 | Cortese | 99/295 |
| 2009/0249961 A1 | 10/2009 | Cheng | 99/289 R |
| 2009/0308259 A1 | 12/2009 | Hiron | 99/323.3 |
| 2010/0011965 A1 | 1/2010 | Turi | 99/289 R |
| 2010/0071563 A1 | 3/2010 | Ryser et al. | 99/295 |
| 2010/0101428 A1 | 4/2010 | Fin | 99/295 |
| 2010/0173053 A1 | 7/2010 | Ryser et al. | 99/295 |
| 2010/0206177 A1 | 8/2010 | Ricotti | 99/295 |
| 2010/0218684 A1 | 9/2010 | Etter et al. | 99/288 |
| 2010/0224077 A1 | 9/2010 | Jing | 99/295 |
| 2010/0282090 A1 | 11/2010 | Etter et al. | 99/288 |
| 2010/0288132 A1 | 11/2010 | Gavillet et al. | 99/295 |
| 2011/0000377 A1 | 1/2011 | Favre | 99/289 R |
| 2011/0041696 A1 | 2/2011 | Aemisegger et al. | 99/281 |
| 2011/0126717 A1 | 6/2011 | Gavillet et al. | 99/288 |

FOREIGN PATENT DOCUMENTS

| | | |
|---|---|---|
| CH | 593044 | 11/1977 |
| CH | 593630 | 2/1978 |
| CH | 682798 A5 | 11/1993 |
| CN | 1137742 A | 12/1996 |
| CN | 1476304 A | 2/2004 |
| CN | 1905827 A | 1/2007 |
| CN | 101073470 A | 11/2007 |
| CN | 101162809 A | 4/2008 |
| DE | 1 590 068 | 4/1970 |
| DE | 2 019 445 | 11/1971 |
| DE | 196 47 039 C2 | 7/1997 |
| DE | 197 37 694 C1 | 10/1998 |
| DE | 197 32 414 A1 | 2/1999 |
| DE | 103 22 034 A1 | 12/2004 |
| EP | 0 387 515 A1 | 9/1990 |
| EP | 0 485 211 B1 | 5/1992 |
| EP | 0 512 142 A1 | 11/1992 |
| EP | 0 512 148 A1 | 11/1992 |
| EP | 0 602 203 B1 | 6/1994 |
| EP | 0 604 615 A1 | 7/1994 |
| EP | 0 730 425 B1 | 9/1996 |
| EP | 0 761 150 A1 | 3/1997 |
| EP | 0 784 955 A1 | 7/1997 |
| EP | 0 862 882 B1 | 9/1998 |
| EP | 0 891 734 A1 | 1/1999 |
| EP | 0 904 717 A1 | 3/1999 |
| EP | 1050258 B1 | 11/2000 |
| EP | 1 121 882 B1 | 8/2001 |
| EP | 1 133 010 A1 | 9/2001 |
| EP | 1153561 B1 | 11/2001 |
| EP | 1 208 782 B1 | 5/2002 |
| EP | 1 219 217 B1 | 7/2002 |
| EP | 1 253 844 B1 | 11/2002 |
| EP | 1 299 022 B1 | 4/2003 |
| EP | 1 380 243 B1 | 1/2004 |
| EP | 1 480 540 B1 | 12/2004 |
| EP | 1 495 702 A1 | 1/2005 |
| EP | 1 529 469 A1 | 5/2005 |
| EP | 1 610 596 B1 | 12/2005 |
| EP | 1 635 680 B1 | 3/2006 |
| EP | 1 646 305 B1 | 4/2006 |
| EP | 1 659 547 A1 | 5/2006 |
| EP | 1 669 011 A1 | 6/2006 |
| EP | 1 721 553 B1 | 11/2006 |
| EP | 1 757 212 A | 2/2007 |
| EP | 1/ 486 150 B1 | 3/2007 |
| EP | 1 774 884 A1 | 4/2007 |

(56) References Cited

FOREIGN PATENT DOCUMENTS

| | | |
|---|---|---|
| EP | 1 775 234 A1 | 4/2007 |
| EP | 1 776 026 B1 | 4/2007 |
| EP | 1 809 151 B1 | 7/2007 |
| EP | 1 829 469 B1 | 9/2007 |
| EP | 1 864 598 A1 | 12/2007 |
| EP | 1 774 878 B1 | 1/2008 |
| EP | 1 878 368 B1 | 1/2008 |
| EP | 1 893 064 B1 | 3/2008 |
| EP | 1859714 B1 | 2/2009 |
| EP | 2 103 236 A1 | 9/2009 |
| EP | 2 181 629 A1 | 5/2010 |
| EP | 2 21 8369 A1 | 8/2010 |
| EP | 2 218 368 A2 | 8/2010 |
| EP | 2 218 370 A2 | 8/2010 |
| EP | 2 374 383 A1 | 10/2011 |
| FR | 1358502 A | 3/1964 |
| FR | 2 424 010 A1 | 11/1979 |
| FR | 2745995 | 9/1997 |
| FR | 2 799 630 A1 | 4/2001 |
| FR | 2 855 359 A1 | 11/2004 |
| FR | 2 898 734 A1 | 9/2007 |
| FR | 2904205 | 2/2008 |
| GB | 847662 | 9/1960 |
| JP | H0138493 B2 | 8/1989 |
| JP | 04-34405 B2 | 6/1992 |
| JP | 2002050726 A | 2/2002 |
| JP | 2003-512117 A | 4/2003 |
| JP | 2004-514488 A | 5/2004 |
| JP | 2004173823 A | 6/2004 |
| JP | 2005149216 A | 6/2005 |
| JP | 2006280208 A | 10/2006 |
| JP | 2007501506 A | 1/2007 |
| JP | 2007506474 A | 3/2007 |
| JP | 2009511102 A | 3/2009 |
| JP | 2003-508102 A | 5/2009 |
| LU | 85316 | 9/1984 |
| RU | 1808642 | 4/1993 |
| TW | 322459 A | 12/1997 |
| WO | WO 94/01344 A1 | 1/1994 |
| WO | WO 95/07041 | 3/1995 |
| WO | WO 95/17121 A | 6/1995 |
| WO | WO 98/47418 A1 | 10/1998 |
| WO | WO 99/51947 A1 | 10/1999 |
| WO | WO 00/45685 A2 | 8/2000 |
| WO | WO 01/30218 A | 5/2001 |
| WO | WO 01/54551 A1 | 8/2001 |
| WO | WO 01/60221 A1 | 8/2001 |
| WO | WO 02/074114 A2 | 9/2002 |
| WO | WO 03/030696 A1 | 4/2003 |
| WO | WO 03/073897 A | 9/2003 |
| WO | WO 2004/006742 A1 | 1/2004 |
| WO | WO 2004/069012 A1 | 8/2004 |
| WO | WO2004/105438 A1 | 12/2004 |
| WO | WO 2005/002405 A2 | 1/2005 |
| WO | WO 2005/004683 A1 | 1/2005 |
| WO | WO 2005/016093 A1 | 2/2005 |
| WO | WO 2005058111 A1 | 6/2005 |
| WO | WO 2005/060801 A1 | 7/2005 |
| WO | WO 2005/072574 A1 | 8/2005 |
| WO | WO 2005/072586 A1 | 8/2005 |
| WO | WO 2005/099534 A1 | 10/2005 |
| WO | WO 2006/003116 A1 | 1/2006 |
| WO | WO 2006/005736 A2 | 1/2006 |
| WO | WO 2006/005756 A1 | 1/2006 |
| WO | WO 2006/023309 A2 | 3/2006 |
| WO | WO 2006/066626 A1 | 6/2006 |
| WO | WO 2006/104575 A1 | 10/2006 |
| WO | WO 2007/016977 A1 | 2/2007 |
| WO | WO 2007/039683 A1 | 4/2007 |
| WO | WO 2007/111884 A2 | 10/2007 |
| WO | WO2007/118944 A1 | 10/2007 |
| WO | WO 2007/122144 A1 | 11/2007 |
| WO | WO 2007/135136 A1 | 11/2007 |
| WO | WO2008/004116 A1 | 1/2008 |
| WO | WO2008/012316 A2 | 1/2008 |
| WO | WO 2008014830 A1 | 2/2008 |
| WO | WO 2008/037642 A2 | 4/2008 |
| WO | WO 2008046740 A1 | 4/2008 |
| WO | WO 2008/154805 A1 | 12/2008 |
| WO | WO 2009/043630 A2 | 4/2009 |
| WO | WO 2009/043851 A2 | 4/2009 |
| WO | WO 2009/043865 A2 | 4/2009 |
| WO | WO 2009/074550 A2 | 6/2009 |
| WO | WO 2009/130099 A1 | 10/2009 |
| WO | WO 2010/015427 A1 | 2/2010 |

OTHER PUBLICATIONS

European Opposition, Appln. No. EP08802980.0, Published evidence, Article: Door Jaqueline Bosboom, "Thuis expresso zetten van professionele allure", (1 page) Jun. 19, 2004.
European Opposition Appln. No. EP08802980.0, Published evidence Pictures prior used Essenza (13 pages) Dec. 30, 2011.
European Opposition Appln. No. EP08802980.0, Magimix Nespresso Essenza Instruction Manual, Essenza Automatic with English Translation, (11 pages), Sep. 2004.
International Search Report, PCT/EP2008/060463 mailed Apr. 1, 2009.
Notice of Allowance, U.S. Appl. No. 12/681,577, dated Mar. 12, 2013.
Non-Final Office Action, U.S. Appl. No. 12/989,072, dated Apr. 15, 2013.
Non-Final Office Action, U.S. Appl. No. 12/681,535, dated Mar. 13, 2013.
U.S. Appl. No. 12/681,577, filed Apr. 2, 2010.
U.S. Appl. No. 12/681,535, filed May 28, 2010.
U.S. Appl. No. 12/681,362, filed Apr. 1, 2010.
U.S. Appl. No. 12/989,072, filed Oct. 21, 2010.
International Search Report, PCT/EP2009/053368, mailed Oct. 6, 2009.
International Search Report, PCT/EP2008/063128, mailed May 8, 2009.
International Search Report, PCT/EP2008/063092, mailed Jul. 6, 2009.
Restriction Requirement, U.S. Appl. No. 12/681,362, dated Sep. 17, 2012.
Non-Final Office Action, U.S. Appl. No. 12/681,362, dated Nov. 30, 2012.
Non-Final Office Action, U.S. Appl. No. 12/681,577, dated Jul. 5, 2012.
Final Office Action U.S. Appl. No. 12/681,577 Jan. 4, 2013.
Notice of Allowance U.S. Appl. No. 12/681,362 Jul. 8, 2013.
Restriction Requirement U.S. Appl. No. 12/681,577, filed May 11, 2012.
Final Office Action U.S. Appl. No. 12/989,072, dated Jun. 26, 2013.
Notice of Allowance U.S. Appl. No. 12/681,535, dated Aug. 5, 2013.

* cited by examiner

BEVERAGE MACHINE WITH CARRYING HANDLE AND CONFIGURABLE APPEARANCE AND SIDE FUNCTIONS

This application is a 371 filing of International Patent Application PCT/EP2009/053139 filed Mar. 17, 2009, which claims the benefit of International Patent Application PCT/EP2008/060463 filed Aug. 8, 2008.

FIELD OF THE INVENTION

The field of the invention pertains to beverage machines, in particular to the ability to displace such machines and to adjust the appearance of the machine to its environment and/or its functional versatility to match the preferences of different users.

For the purpose of the present description, a "beverage" is meant to include any liquid food, such as tea, coffee, hot or cold chocolate, milk, soup, baby food, etc. . . .

BACKGROUND ART

Certain beverage preparation machines use capsules containing ingredients to be extracted or to be dissolved; for other machines, the ingredients are stored and dosed automatically in the machine or else are added at the time of preparation of the drink.

Most coffee machines possess filling means that include a pump for liquid, usually water, which pumps the liquid from a source of water that is cold or indeed heated through heating means, such as a heating resistor, a thermoblock or the like.

Such machine typically have a brewing unit for holding and extraction the beverage ingredient. To introduce the ingredient into the brewing unit and then remove the ingredient upon use, the brewing unit has a closure mechanism that may be driven by a handle that is operable by a user.

EP 1 208 782 discloses a coffee machine having a main body including a brewing unit for extracting coffee capsules. The brewing unit is opened and closed with the aid of a handle that can be turned over the main body by an angle of about a 180 deg. from behind to the front of the main body. The handle has a pair of generally L-shaped levers connected at one end by a hand-drivable transverse rod and pivotally mounted at the opposite end to the opening and closing mechanism of the brewing unit. The pivotable L-shaped levers drive a movable part of the brewing unit via a pair of intermediate levers connected at a first end to this movable brewing unit part and at a second end to the corner of the L-shaped levers.

US 2008/0006159 discloses a brewing unit for an undisclosed coffee machine body. The brewing unit has a horizontally movable drawer for introducing an ingredient pouch and a vertically movable top part with a piercing mechanism for opening the pouch. These elements are driven by a generally U-shaped movable handle that can be pivoted from an upright open position down to a generally horizontal closed position.

U.S. Pat. No. 7,165,488, WO 2007/111884 and EP 1 829 469 disclose a beverage machine having a main body with a foot extending in front of the machine for supporting a cup to be filled with beverage as well as an overhanging brewing unit above this foot. The brewing unit can be opened and closed manually by means of a handle system that is linked to a movable top part of the brewing unit and indirectly to a top front part of the main body.

Such machines are usually arranged to be placed at some convenient location on a support surface in a kitchen or bar or in an office or in another suitable environment, typically close to the mains and to a source of water, in particular close to the kitchen sink, and are not easily movable. This is inconvenient when the machine or the supporting surface needs to be cleaned or the machine otherwise moved, e.g. to a different room. When this happens, the user tends to seize the machine wherever he manages to find some gripping means, e.g. at the outlet nozzle, at the drip tray, by the machine's opening for the drip tray or waste ingredient container, under the machine's bottom . . . in an unreliable manner which may lead to dropping the machine, damaging parts of the machine exposed to excessive mechanical stress due to seizure of the machine at improper locations, to the falling out/off of some movable parts of the machine, such as the already mentioned drip tray, waste ingredient collector or even the water reservoir.

Moveable coffee machine are already known. EP 1 878 368 discloses a beverage machine having a functional block that is rotatably mounted on a support base. The functional block can be designed to be removable from the support base. EP 1 864 598 discloses an autonomous beverage machine that can be mounted onto a docking station. The beverage machine is arranged to be operable whether connected to the docking station or disconnected therefrom.

However, there is still a need to provide a coffee machine arranged so that is can be easily lifted and/or carried around by a user, in particular single-handed, and moreover, a machine whose appearance may be adjusted to fit different environments.

SUMMARY OF THE INVENTION

It is a preferred object of the present invention to provide a beverage preparation machine with a simple arrangement for allowing a user to displace safely the machine.

The invention thus relates to a machine for preparing a beverage, in particular from a pre-portioned ingredient such as an ingredient supplied to such machine within a capsule.

For instance, the machine is a coffee, tea or soup machine, in particular a machine for preparing within an extraction unit a beverage by passing hot or cold water or another liquid through a capsule or pod containing an ingredient of the beverage to be prepared, such as ground coffee or tea or chocolate or cacao or milk powder.

The machine comprises a main body containing a brewing unit for housing this ingredient.

Typically, main body includes one or more of a pump, heater, drip tray, ingredient collector, liquid tank and fluid connection system for providing a fluid connection between the liquid tank and the brewing unit, etc. . . . . The configuration of a fluid circuit between the liquid reservoir and a heater for such a machine is for example disclosed in greater details in co-pending application PCT/EP08/067,072.

The machine further comprises a handle movable, in particular pivotable, relative to the main body, so as to act on the brewing unit to open the brewing unit for introduction or removal of this ingredient into and from the unit, and act to close the brewing unit for extraction of this ingredient within the unit. The movable handle has a gripping part and is arranged to be drivable by a human hand.

In accordance with the invention, the main body and the movable handle are so connected and configured that the gripping part has a carrying position in which the gripping part is seizable by such human hand for safe lifting and displacing of such machine single-handed.

This handle and main body should be so arranged that the entire weight of the main body can be supported by the handle without risk of damage or deformation of the machine, as might for instance happen if a user pulls a machine by seizing an apparent component such as a beverage outlet, an electric cable or a handle closing or opening the brewing unit or prior art handles on machines that have not been structurally configured for this purpose. The size and shape of the gripping part should be adapted to the shape and capacity of a normal human hand to allow a firm seizure by the hand, sufficient for the user to safely carry the machine with all its weight single-handed via the gripping part. Optionally, the gripping part includes a means, such as a surface structure or composition, in particular an anti-skid surface that provides friction against a human hand to reduce the necessary gripping force needed to achieve a reliable gripping.

Hence, the machine of the invention provides a simple handle for the user to operate the machine, for opening and closing the brewing unit, and lift and/or displace the machine.

The ability to lift a machine single-handed allows for instance to lift the machine with one hand wipe and clean the supporting surface, e.g. a table, with the other hand and replace the machine, in a single operation.

The machine typically has an operative orientation, e.g. when placed on a table or other horizontal surface, for dispensing beverages. The machine would also have a corresponding carrying orientation when lifted single-handed by the gripping part of the handle. In this case, the carrying orientation can be inclined relative to the operative orientation by a tilting angle of less than 30 deg, such as in the range of 1 to 10 or 20 deg, the carrying orientation being in particular identical to the operative orientation. When the carrying orientation is inclined in such a manner, it means that the machine when lifted is slightly tilted with respect to its operative orientation. Different tilting angles for the same machine may for instance result from the presence in the machine's main body of liquid or ingredient reservoirs whose state of filling affect the position of the centre of gravity of the machine.

For instance, the main body has a foot or bottom face for resting on a generally parallel horizontal external support surface, such as a table. In this case, the gripping part of the handle in its carrying position and the centre of gravity of the machine's body can be vertically aligned, perpendicularly to the foot or bottom face, in which case the machine is not tilted when lifted via the handle. Alternatively, the gripping part of the handle in its carrying position and the centre of gravity of the machine's body can be at a tilting angle of less than 30 deg thereto, such as in the range of 1 to 10 or 20 deg to a perpendicular direction to the foot or bottom face of the machine.

Typically, the handle can be pivotally mounted on the main body about a pivoting axis, in particular a pivoting axis fixed relative to the main body. It is also possible to provide a handle with a translation movement.

The machine's centre of gravity, the gripping part in its carrying position, and the pivoting axis can be generally coplanar or aligned, or form a tilting angle of less than 25 deg, in particular in the range of 1 to 10 or 15 deg, with the gripping part as vertex.

The machine's centre of gravity may be displaced when the gripping part is moved into its carrying position from a position distant thereof, so as to minimise the tilting angle.

The handle may act on the brewing unit to move at least a part thereof towards or away from the gripping part, when the gripping part is moved into the carrying position, whereby the centre of gravity is displaced. Hence, the movement of the movable part of the brewing unit can be advantageously configured so that the centre of gravity of the machine is displaced to an optimal place for lifting and/or displacing single-handed the machine, e.g. underneath the gripping part of the handle or closely thereto leading to minimal or no tilting of the machine when lifted.

Typically, the handle may form half a loop around a part of the main body, in particular around a top part of the main body, the gripping part being usually a middle part of the loop. The handle can be generally U-shaped or arched or semi-circular or semi-elliptic, the handle being in particular pivotally mounted at two extremities thereof onto the main body.

In one embodiment, the handle is pivotable about a top part of the machine's main body, in particular from above the top part to an upper front or upper rear side portion of the main body, typically adjacent the machine's beverage outlet. For instance, the brewing unit has a movable part that is telescoped out of the body when the gripping part of the handle is in its carrying position, and that is retracted into the body when the brewing unit is closed and the gripping part is in a beverage extraction position. Optionally, the gripping part in the beverage extraction position and the movable part of the brewing unit when opened are at an identical location. In this case, when the gripping part is moved into the extraction position to close the brewing unit, the movable part of the brewing unit is retracted into the machine's main body and the handle's gripping means takes the place freed by the movable part of the brewing unit. Such an embodiment leads to minimising the space needed for operating the machine and to a machine that is better balanced about its handle when lifted and/or displaced by holding single-handed the machine by the handle.

Typically, the gripping part of the handle in its carrying position is arranged to accommodate for seizure by at least three or four fingers of a human hand. Hence the user may firmly and safely seize the gripping part to lift and displace de machine single-handed.

Usually, the main body includes one or more removable parts, such as removable parts selected from a drip tray and a liquid receptacle and used ingredient receptacle and an ingredient supply device, the removable parts being so secured in the body and/or the body having such an orientation during lifting and displacing, that all the removable parts remain safely in place relative to the body when such machine is displaced single-handed.

Another aspect of the invention concerns a machine for preparing a beverage, in particular as described in above. Moreover, the machine according to this aspect of the invention may include any feature or combination of features of the above described machine.

The machine of this aspect of the invention comprises a main body containing a brewing unit for housing an ingredient, in particular a pre-portioned ingredient such as an ingredient supplied to such machine within a capsule. Furthermore, the main body has an outermost casing. The machine further includes a handle having two facing connection extremities pivotally connected to the brewing unit via corresponding pivotable axles, so as to act on the brewing unit to open the brewing unit for loading and/or unloading this ingredient into and from the unit, and so as to act to close the brewing unit for extraction of this ingredient within the unit.

In accordance with the invention, the handle extends outside the main body from one side to a facing opposite side of the outermost casing and is connected to the brewing unit via the pivotable axles through the facing opposite sides of the outermost casing, the handle extending in particular around facing lateral walls.

By providing such a configuration of the handle and the machine's main body, in particular the pivotable axles connecting the handle to the brewing unit via the casing, the body's casing may extend and shield the main body nearby the handle and requires only two small holes for allowing the passage of the axles. In contrast, when lever portions of the handle extend through the casing, large openings are required in the casing for allowing displacements of the lever portions of the handle through and along the casing.

Furthermore, such a handle extending around the facing sidewalls may be used to secure or contributes to secure these sidewalls together and simplify the assembly arrangement of the casing.

A further aspect of the invention relates to a machine for preparing a beverage, in particular a machine as defined above. The machine has: a main body comprising at least part of a fluid system for preparing a beverage from an ingredient housed in a brewing unit, in particular a pre-portioned ingredient such as an ingredient supplied to such machine within a capsule; and an outermost casing for containing and shielding the main body. In accordance with the invention, the casing comprises at least one panel that is detachably mounted onto the main body or to further parts of the casing by connection means that are accessible and connectable and disconnectable by a user to remove and substitute the panel by another compatible panel.

Typically, the user may be provided with a set including this machine with a casing that comprises such a panel as well as a plurality of separate different compatible panels for substituting the panel. Hence, different kinds of compatible panels may be made available to the user in order to enable him to change the machine's appearance and adjust it to a different location, e.g. a different room.

For instance, a user may want to have the machine's appearance aligned to a kitchen of a certain colour, e.g. brown, and thus have a beverage machine of the same or compatible colour, e.g. brown, red or beige. If the user wants to move his beverage machine into a different room, e.g. dining room or living room having a colour arrangement, e.g. greenish, that is different to his kitchen, he may want to adjust the appearance of his beverage machine and exchange the panels with panels of a different colour, e.g. green or turquoise. Some users may also want to have machines with a flashy, possibly multi-colour, appearance and mount corresponding panels. Other users may want to have visual access inside the machine and thus mount transparent panels.

Moreover, various different compatible types of panels may be configured to provide different functions. For instance, one type of panel may be provided merely to dress the beverage machine. Another type of panels may be provided with one or more laterally and/or generally horizontally extending support members e.g. for accessories, such as cups, spoons, cream, sugar, etc. . . . For example, a support member is dedicated for cups and has an integrated heater for preheating the cups. The heater may be electrically powered by the electric circuit of the machine via a plug and socket system in the panel and the inside of the beverage machine. Hence the functional versatility of the machine may be increased to match the preferences of different users.

Hence, the machine and set of the present invention provide the user with great flexibility as to the appearance of the machine and adjusting possibilities to fit the taste of the user. This flexibility and adjustment possibilities are simple, inexpensive and do not involve the need to acquire a whole new machine or return the machine to a professional retrofitter.

A yet further aspect of the invention relates to a machine for preparing a beverage, in particular as described above. The machine has: a main body containing at least part of a fluid system for preparing a beverage from an ingredient housed in a brewing unit, in particular a pre-portioned ingredient such as an ingredient supplied to such machine within a capsule; and an outermost casing for containing and shielding the main body. In accordance with the invention, the casing comprises at least one side panel that has a horizontally extending member for supporting accessories, the horizontally extending member being optionally retractable in particular in a vertical position and/or provided with a heater for preheating cups.

BRIEF DESCRIPTION OF THE DRAWINGS

The invention will now be described with reference to the schematic drawings, wherein.

DETAILED DESCRIPTION

Figure 1:
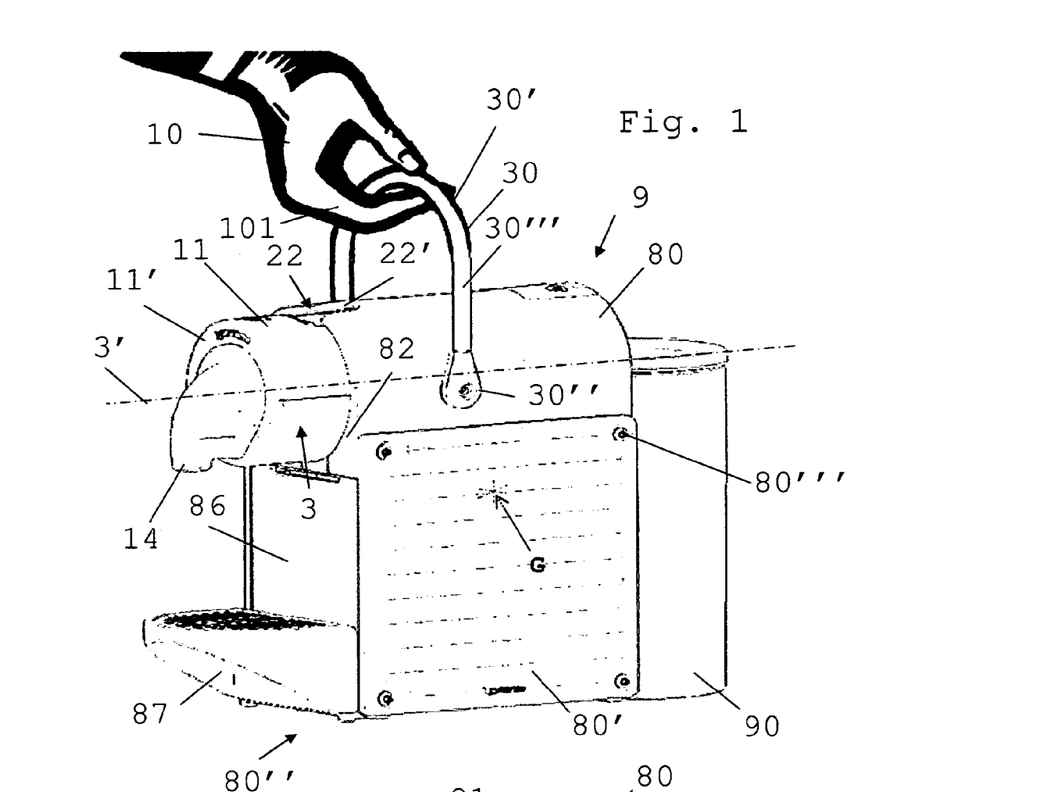
FIGS. 1 and 2 illustrate a beverage machine according to the invention.
Figure 2:
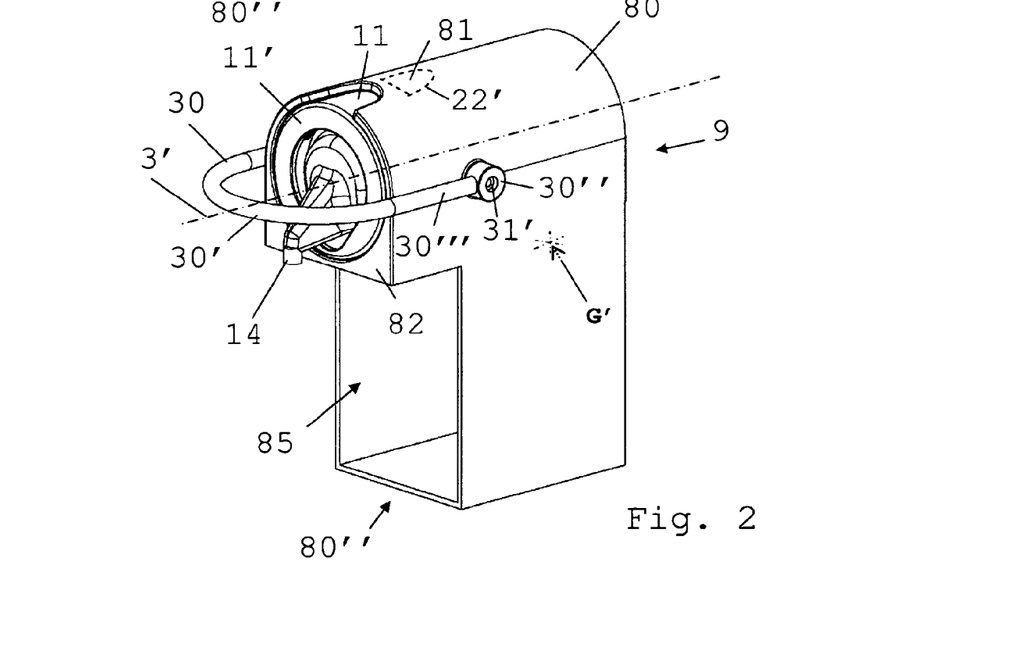
Figure 3:
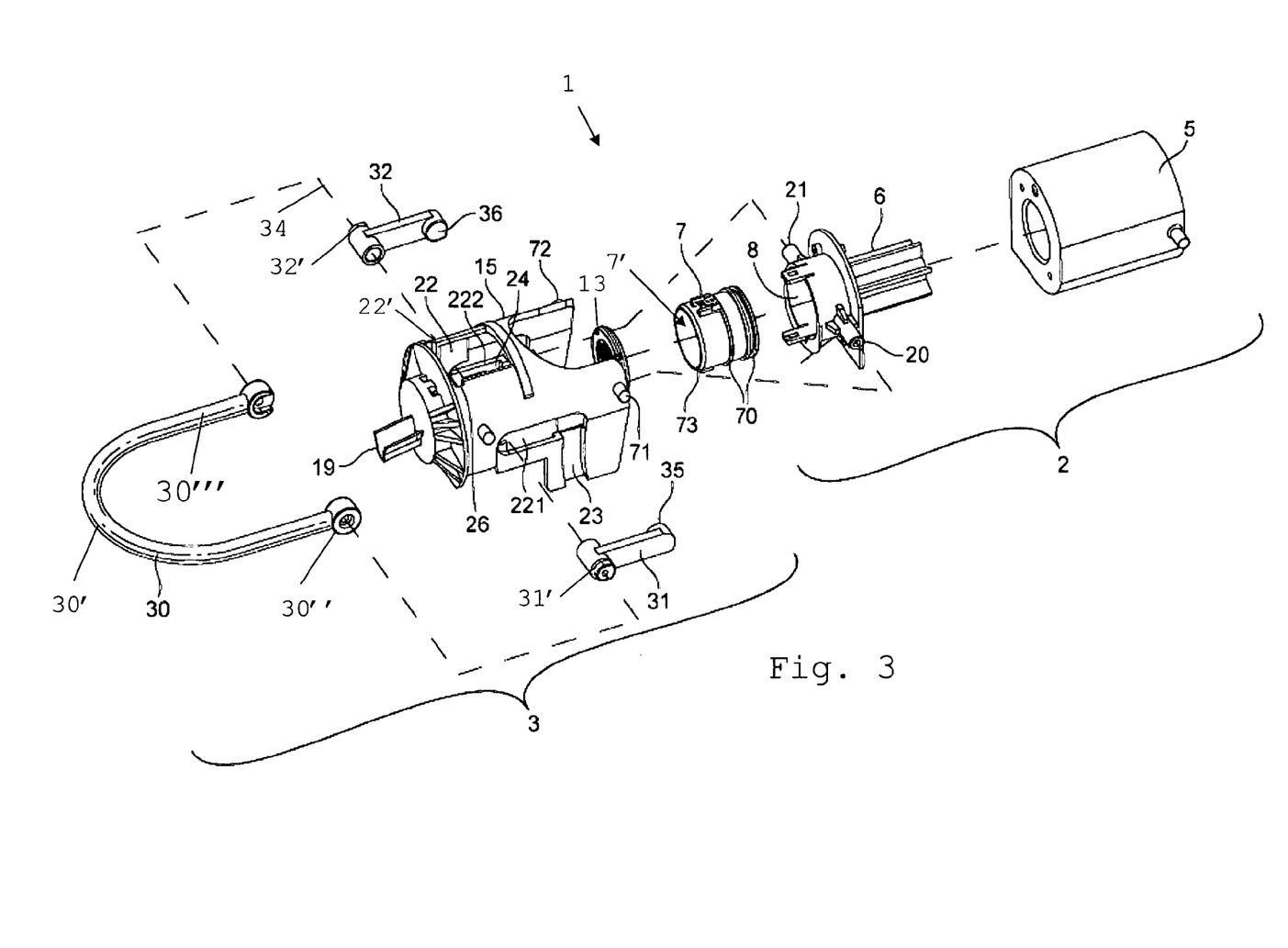
FIG. 3 shows an exploded view of a brewing unit of this machine.

FIGS. 1 and 2 illustrate a beverage machine, in particular a coffee machine, with a main body 9 having an outermost casing 80 and a handle 30 according to the invention. FIG. 3 shows an exploded view of a brewing unit 1 contained within such an outermost casing, the internal brewing unit 1 being connectable to handle 30 that remains outside such an outermost casing.

As shown in FIG. 1, casing 80 is associated with a pair of exchangeable side panels 80' that can be removably mounted on each side of casing 80, e.g. by screwing or clipping or other means, such as four screws 80'''. In FIG. 2, panels 80' have been removed and casing 80 is shown uncovered. Panel 80' is secured to the machine by four screws 80'''. Hence, a user may easily change the appearance of the machine by exchanging side panels 80' with different side panels having the same connection system, e.g. panels having a different colour or colour arrangement and/or a different profile or texture, and align it to an environment into which the user wishes to locate the machine or according to the user's visual preferences.

Figure 5:
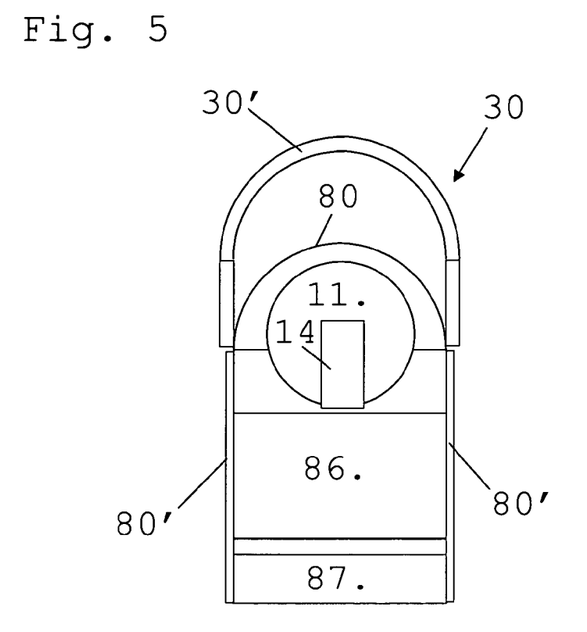
FIGS. 5 and 6 schematically illustrate a beverage machine with different substitutable side panels in accordance with the invention.
Figure 6:
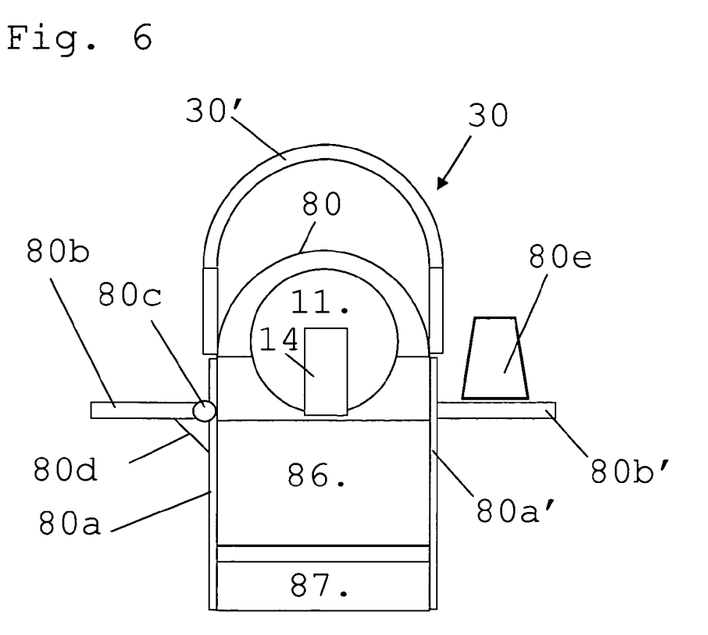

Furthermore, FIGS. 5 and 6, in which the same numeric references designate generally the same elements, schematically show a front view of the beverage machine with different interchangeable side panel 80',80a,80a' for the same machine. FIG. 5 shows the beverage machine with the plain side panels 80' as shown in FIG. 1. The machine illustrated in FIG. 6 has on the left-hand side a side panel 80a with a horizontally deployed support member 80b that extends along side panel 80a and that is removable or retractable. In particular, support member 80b is pivotable downwards around pivoting point 80c after having been unlocked by flipping inside locking wedge 80d around a vertical axis out of the way of support member 80b. On the right-hand side of FIG. 6, the machine has a panel 80a' with a fixed support member 80b'. Support members 80b,80b' may serve to support cups 80e or other accessories for the beverage machine. In particular, support members 80b,80b' may incorporate a heater, e.g. a thick film heater, that is powered through the panel from the machine electric system via a connector and a plug (not shown) on the inside of panel 80a,80a' that may be easily connected and disconnected by the user when panels are exchanged. It is also possible to provide a support member on one side for holding clean cups and on the other side for used cups. In this case, the support member for used cups may incorporate a drip tray arrangement for collecting liquid dripping from the used cups. Such a configuration may be particularly useful when the beverage machine is brought to a location that is distant from the kitchen, in particular from a kitchen sink, so that a user has clean cups readily available as well as a place to leave the used cups without making a mess.

Turning back to FIG. 1, the machine's main body 9 has a water tank 90 on a rear part for the supply of water.

A translational closure mechanism is associated with brewing unit 1 to open and close it along a straight line 3' in a telescopic manner. The closure mechanism of such a beverage machine is discussed in greater details in co-pending application PCT/EP08/060,463, the priority of which is claimed and the content of which, in particular relating to its FIGS. 2a,2b and 7 to 11, is hereby incorporated by way of reference.

Brewing unit 1 comprises a capsule holding assembly with a beverage outlet 14 forming a first movable assembly 3 and a water injection assembly with a water inlet or line forming a second fixed assembly 2. Each assembly 2,3 delimits at least part of a brewing chamber 7' for containing an ingredient capsule. In a variation, the capsule injection assembly may be movable and the capsule holding assembly may be fixed or movable.

Holding assembly 3 has a generally tubular cover 11 and is movable away from the cooperating injection assembly 2 into an open position, as shown in FIG. 1. In this position, assemblies 2,3 delimit between them a passage 22 for inserting into and/or removing from brewing unit 1 the ingredient capsule. As shown in FIG. 1, when brewing unit 1 is open, i.e. when holding assembly 3 is in its outermost position, passage 22 formed between spaced apart holding assembly 3 and injection assembly 2 through tubular cover 11 permits insertion of a capsule into brewing unit 1 via an opening 22' of passage 22. When brewing unit 1 is closed, i.e. when holding assembly 3 is moved to its innermost or retracted position, as shown in FIG. 2, opening 22' is displaced in translation in a direction 3' transverse to the direction of introduction of the capsules into passage 22. Opening 22', indicated in doted lines in FIG. 2, is then entirely hidden under a plate-like edge part 81 that forms a closure or cover part of casing 80 for closing passage opening 22'. Casing 80 and tubular cover have generally flat, slightly arched, corresponding matching surfaces so that passage opening 22', in its translational movement, slides under closure part 81 parallelly thereto.

By moving holding assembly 3 against the injection assembly 2 into the closed position, as shown in FIG. 2, a brewing chamber 7' is formed and sealed around such a capsule in the brewing position. Moreover, cover 11 of holding assembly 3 has an outer face 11' that is brought into a position substantially adjacent and coplanar with an outer face 82 of outermost casing 80.

Hence, the machine has an outermost casing 80 and one of its brewing unit assemblies 2,3 can be moved or telescoped out through casing 80 for inserting/removing an ingredient capsule, and can be retracted into outermost casing 80 for bringing brewing unit 1 into its capsule extraction or brewing configuration.

Underneath brewing unit 1, casing 80 has a cavity 85 for receiving a removable receptacle 86. The front part of cavity 86 is delimited by side panels 80'. Brewing unit 1 and receptacle 86 are so arranged that passage 22 has a lower opening giving into receptacle 86. Hence, when brewing unit 1 is reopened after extraction, the used capsule drops into receptacle 86. Holding and positioning mechanisms for the insertion and removal of the capsule in such a brewing unit are for example disclosed in EP 1 646 305 and EP 1 859 714.

Hence, holding assembly 3 is movable with its tubular cover 11 in translation along a straight direction 3' from the closed position to the open position and vice versa so as to open passage 22 for the insertion of a capsule, close brewing unit 1 for the extraction of the capsule therein and reopen passage 22 for the evacuation of the capsule therefrom into receptacle 86.

Receptacle 86 is positioned on a drip tray arrangement 87 for supporting a cup under beverage outlet 14 and for collecting drips and spills. Receptacle 86 and drip tray arrangement 87 may be inserted and removed en bloc into and from cavity 85. Suitable embodiments of such drip tray and receptacle arrangements are for example disclosed in EP 1 867 260.

FIG. 3 is an exploded view illustrating in greater details brewing unit 1 of the exemplary beverage machine of the invention. Brewing unit 1, shown without its tubular cover 11 and without the outside casing 80, has a water injection assembly 2 and a capsule holding assembly 3. The water injection assembly 2 includes a heater 5, e.g., a thermoblock, which is placed in direct fluid connection with a guide support 6 and a capsule cage 7. The capsule cage 7 has typically the form of a cup to enclose the capsule in closure with the capsule holding assembly 3. The capsule cage 7 is inserted in a cylindrical housing 8 of the guide support. Sealing means may be provided to ensure a watertight connection between the cage 7 and the guide support 6. A water line is provided through the water injection assembly to guide water in the capsule cage. The capsule cage also possesses opening members such as blades to pierce the capsule for enabling water to be introduced into the capsule.

Brewing unit 1 further includes a capsule handling assembly 3 which comprises a main body portion 15 having an upper passage 22 with an opening 22' for inserting the capsule in a capsule cage 7. A puncturing plate 13 is lodged inside and in the front of body portion 15. On the front side of body portion 15 is provided a beverage delivery duct 19 for delivering the beverage from the capsule cage 7 via the puncturing plate 13 to a receptacle (e.g., a cup) via outlet duct 14 of tubular cover 11.

Water injection assembly 2 is mounted in the capsule handling assembly 3 in a linearly moveable fashion via two lateral pins 20, 21 placed on each side of the guide support 6 which respectively engage a pair of guiding slots 221, 222 provided on the side of the handling assembly 3. The pins 20, 21 are directly linked to a lever assembly 30, 31, 32. The lever assembly is axially connected along a transversal axis 34 to the pins 20, 21. The lever assembly has a U-shaped handle 30 and two guiding rods 31, 32. Handle 30 is connected via its extremities 30" to axles 31',32' of rods 31,32 along axis 34. Rods 31,32 prolong the handle beyond the axis 34 in a linear direction with small interior pins 35, 36 which slide along downward extensions 23, 24 of the slots. Handle 30 has a middle gripping part 30' arranged to be driven by a human hand 10 and a pair of connection extremities 30" linked via levers 30''' for amplifying the transmitted force from hand-driven gripping part 30' to rods 31,32.

Closure of brewing unit 1 is obtained by handling and pulling handle 30 down in the position of FIG. 2. This result in pulling on the guiding support 6 via pins 20, 21 and in placing the capsule cage 7 in tight contact pressure of its annular free edge 73 against the puncturing plate 13 to from brewing chamber 7'. The water injection assembly 2 is preferably fixed whereas the front capsule handling assembly 3 is mobile and moved backwards to the water injection assembly.

Body portion has external guiding pins 71, 72 which engage with outer casing 80 of the machine.

When brewing unit 1 is in its open configuration, as shown in FIG. 1, handle 30 is in an upright position. In this position, assemblies 2,3 are distant for leaving a large gap between them enabling insertion and placement of the capsule.

In this open configuration, the machine's main body 9 and movable handle 30 are so connected and configured that gripping part 30' has a carrying position in which the gripping part 30' is seizable by human hand 10 for safe lifting and displacing of the beverage machine single-handed, in accordance with the invention.

Hence, handle 30 extends outside main body 9 from one lateral side to a facing opposite lateral side of outermost casing 80 and is connected to brewing unit 1 via the pivotable axles 31',32' that extend through the facing opposite sides of the outermost casing 80.

Figure 4A:
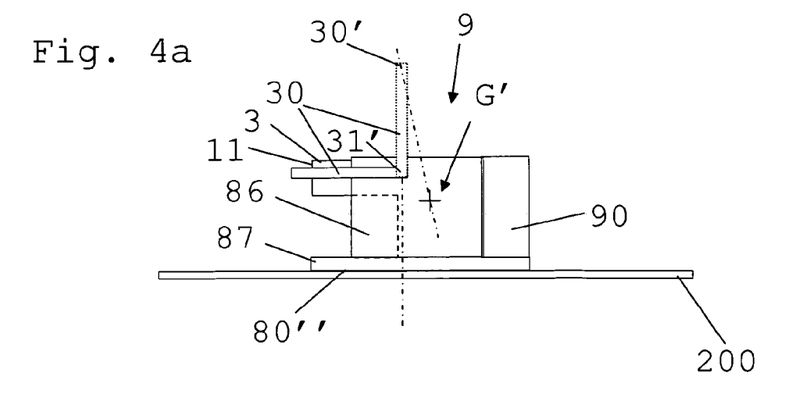
FIGS. 4a to 4c schematically illustrate a lifting sequence of a beverage machine according to the invention.
Figure 4B:
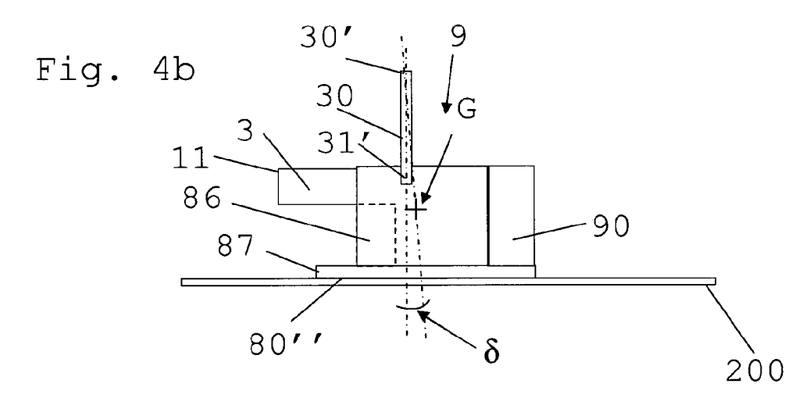
Figure 4C:
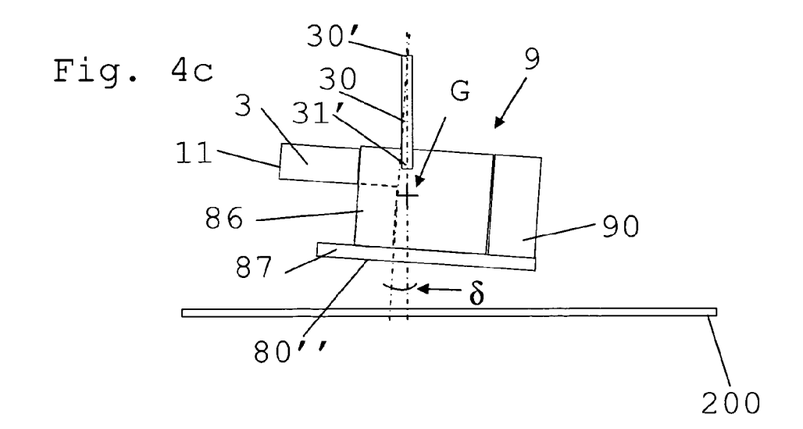

FIGS. 4a to 4c, in which the same numeric references generally designate the same elements, schematically illustrate the lifting sequence of an exemplary machine according to the invention. The beverage machine has a normal operative orientation for dispensing beverages via outlet 14 (FIGS. 4a and 4b) and a corresponding carrying orientation when lifted single-handed by gripping part 30' (FIG. 4 c). The carrying orientation can be inclined relative to the operative orientation by a tilting angle of less than 30 deg, such as in the range of 1 to 10 or deg, the carrying orientation being in particular identical to the operative orientation.

As illustrated in FIGS. 4a and 4b, the beverage machine's operative orientation for dispensing beverages typically corresponds to the machine's state when it rests on a horizontal table 200. The machine further has a corresponding carrying orientation when lifted single-handed by the gripping part 30', as illustrated in FIG. 4c. In the case of the particular embodiment shown in FIGS. 4a to 4c, the carrying orientation is inclined relative to the operative orientation by a tilting angle δ of about 5 deg. Tilting angle δ may vary for the same machine depending on the level of fill of its water reservoir 90, of the receptacle 86 for collecting used ingredients, and of the drip tray 87.

The main body 9 has a centre of gravity G and a foot or bottom face 80" for resting on a generally parallel horizontal external support surface such as table 200.

When the machine is lifted as illustrated in FIG. 4c, and centre of gravity G and gripping part 30' (in its carrying position) are vertically aligned and inclined to the foot or bottom face at a tilting angle of about 5 deg to a perpendicular direction to foot or bottom face 80".

As mentioned above, handle 30 is pivotally mounted on main body 9 about a pivoting axis 31'. When the machine is lifted as illustrated in FIG. 4c, centre of gravity G, gripping part 30' and pivoting axis (31') are generally coplanar or aligned and the machine is tilted by angle δ. When the gripping part 30' it upright in its carrying position before lifting as shown in FIG. 4b, centre of gravity G, gripping part 30' and pivoting axis 31' form a tilting angle δ, with the gripping part as vertex.

As illustrated in FIGS. 4a and 4b, centre of gravity G,G' of main body 9 is displaced in a direction towards the front of the machine thereby minimising tilting angle δ, when gripping part 30' is moved into its carrying position from a position distant thereof. In this case, the handle 30 acting on the brewing unit 1 moves front part 3 away from gripping part 30' whereby the centre of gravity G,G' is displaced when the gripping part 30' is moved into the carrying position.

As shown in FIGS. 4a and 4b, handle 30 is pivotable about a top part of main body 9, from above the top part to an upper front part 11 of main body 9. Brewing unit 1 has a movable part 3 that is telescoped out of body 9 when gripping part 30' of handle 30 is in its carrying position and that is retracted into body 9 when brewing unit 1 is closed and gripping part 30' is in a beverage extraction position. Gripping part 30' in the beverage extraction position, as illustrated in FIG. 4a, and movable part 3 of brewing unit 1 when opened for loading and/or unloading, as illustrated in FIG. 4b, being at an identical location, one element taking the place of the other one when brewing unit 1 is closed.

Turning back to FIG. 1, gripping part 30', in its carrying position, is arranged to accommodate for seizure by at least four fingers 101 of a human hand 10. Hence, gripping part 30' will be provided with a corresponding configuration and size. Typically, the gripping part will have a length of about 10 to 15 or 20 cm. Possibly, the gripping part will have an appropriate profile to accommodate four fingers 101. However, as illustrated in FIGS. 1 to 3, it is also possible to provide a rod, in particular a bent rod, having a circular cross section to improve ergonomic seizure of the rotating grip 30' when hand-driven from the beverage extraction position to the lifting position and vice versa.

Main body 9 includes a plurality of removable parts, such as a drip tray 87, a water receptacle 90 and a used ingredient receptacle 86. Such removable parts 86,97,90 are so secured in body 9 and/or body 9 having such an orientation during lifting and displacing, that all removable parts remain safely in place relative to body 9 when such machine is displaced single-handed. As shown in FIG. 4c, ingredient receptacle 86 remains naturally in cavity 85 due to the orientation. Drip tray 87 requires a holding arrangement to prevent dropping out from the bottom. For instance, body 9 has a horizontal drawer-type arrangement that receives drip tray 87 and that maintains it when the machine is lifted. Furthermore, water reservoir 90 should be safely mounted onto a bottom part of the machine or against casing 80 so that it does not fall off while the machine is lifted and displaced.

The beverage machine of the invention is of a particularly simple conception and is configured, in a simple manner, to be easily and safely liftable and displaceable, single-handed by a user, and a simple arrangement to adapt the look of the machine typically to adapt the look of the machine when it is moved to a different location.

What is claimed is:

1. A machine for preparing a beverage, comprising:
   a main body containing a brewing unit for housing a pre-portioned beverage forming ingredient; and
   a handle movable relative to the main body, so as to act on the brewing unit to open the brewing unit for introduction or removal of the ingredient into and from the unit, and to close the brewing unit for extraction of the ingredient within the unit, with the handle being arranged to be drivable by a human hand, with the handle securely attached to the main body to support the entire weight of the main body without risk of damage or deformation of the machine;
   a gripping part, as part of the handle, configured and dimensioned for seizure by at least four fingers of one adult human hand and has a length of 10 to 20 cm;
   wherein the main body and the handle are so connected and configured that the handle and gripping portion are movable to a carrying position in which the gripping part is seizable by the one adult human hand for lifting and displacing of the machine; and
   wherein the main body has a foot or bottom face for resting on a generally parallel horizontal external support surface, wherein the gripping part in its carrying position is vertically aligned perpendicularly to the foot or bottom face when on the external support surface, and is moved to a closed position in horizontal alignment parallel to the foot or bottom face when resting on the external support surface to close the brewing unit for extraction of the ingredient within the unit.

2. The machine of claim 1, wherein the pre-portioned beverage forming ingredient is supplied to the machine within a sealed brewing capsule.

3. The machine of claim 1, which has an operative orientation for dispensing beverages and a corresponding carrying orientation when lifted single-handedly by the gripping part, wherein the main body of the machine in the carrying orientation is inclined relative to its position in the operative orientation by a tilting angle of 1 to less than 30 degrees thereto, such that the rotational position of the main body in the carrying orientation is the same as its position in the operative orientation.

4. The machine of claim 1, wherein the handle is pivotable between positions wherein the brewing unit is opened and closed for extraction of the ingredient within the unit.

5. The machine of claim 4, wherein the main body has a center of gravity and the handle is pivotally mounted on the main body about a pivoting axis so that the gripping part is pivotable from its vertical carrying position, where the brewing chamber is opened for receipt of the pre-portioned beverage forming ingredient, to its closed horizontal position to allow the brewing chamber to extract a beverage within the unit from the pre-portioned beverage forming ingredient.

6. The machine of claim 5, wherein the center of gravity of the main body is displaced in a direction to minimise the tilting angle when the gripping part is moved into its carrying position from a position distant thereof.

7. The machine of claim 6, wherein the handle acts on the brewing unit to move at least a part thereof towards or away from the gripping part whereby the center of gravity is displaced when the gripping part is moved into the carrying position.

8. The machine of claim 1, wherein the handle forms half a loop around a top part of the main body, with the gripping part being a middle part of the loop.

9. The machine of claim 8, wherein the handle is generally U-shaped or arched or semi-circular or semi-elliptical and is pivotally mounted at two extremities thereof on the main body.

10. The machine of claim 1, wherein the handle is pivotable from above the top part of the main body to an upper front or upper rear side portion of the main body.

11. The machine of claim 5, wherein the brewing unit has a movable part that is telescoped out of the body when the gripping part of the handle is in its carrying position and is retracted into the body when the brewing unit is closed and the gripping part is in a beverage extraction position.

12. A machine for preparing a beverage, comprising:
a main body containing a brewing unit for housing a pre-portioned beverage forming ingredient; and
a handle movable relative to the main body, so as to act on the brewing unit to open the brewing unit for introduction or removal of the ingredient into and from the unit, and to close the brewing unit for extraction of the ingredient within the unit, with the handle being arranged to be drivable by a human hand;
a gripping part, as part of the handle, configured and dimensioned for seizure by at least four fingers of one adult human hand and has a length of 10 to 20 cm;
wherein the main body and the handle are so connected and configured that the gripping part has a carrying position in which the gripping part is seizable by the one adult human hand for lifting and displacing of the machine;
wherein the brewing unit has a movable part that is telescoped out of the body when the gripping part of the handle is in its carrying position and is retracted into the body when the brewing unit is closed and the gripping part is in a beverage extraction position; and
wherein the gripping part in the beverage extraction position and the handle run parallel to the base of the main body of the machine when the brewing unit is closed with the movable part telescoped into the body.

13. The machine of claim 1, wherein the main body includes one or more removable parts, including a drip tray, a liquid receptacle, a used ingredient receptacle or an ingredient supply device, with the removable part(s) either being secured in the body or the body having such an orientation during lifting and displacing that all the removable parts remain safely in place relative to the body when such machine is displaced.

14. The machine of claim 1, wherein the main body further includes one or more of a pump, heater, drip tray, ingredient collector, liquid tank and fluid connection system for providing a fluid connection between the liquid tank and the brewing unit.

15. A machine for preparing a beverage, comprising:
a movable handle in cooperative association with the brewing unit, wherein the handle movement acts to open a brewing unit for introduction or removal of the ingredient into and from the unit, and to close the brewing unit for extraction of the ingredient within the unit, with the movable handle comprising:
a gripping part configured and dimensioned for seizure by at least four fingers of a normal adult human hand and has a length in the range of 10 to 20 cm, with the handle securely attached to the main body to support the entire weight of the main body without risk of damage or deformation of the machine; and
a main body containing a brewing unit for housing a pre-portioned beverage forming ingredient; and
wherein the handle includes two facing connection extremities pivotally connected to the brewing unit via corresponding pivotable axles so as to act on the brewing unit to open the brewing unit for introduction or removal of the ingredient into and from the unit, and to close the brewing unit for extraction of the ingredient within the unit, with the handle connecting to the brew unit through a casing that contains the brew unit, and the handle extends outside the main body from one side to a facing opposite side of the casing, the handle optionally extending around facing lateral walls; and
wherein the main body has a foot or bottom face for resting on a generally parallel horizontal external support surface, wherein the handle and gripping portion are movable to a carrying position and the gripping part in the carrying position is vertically aligned perpendicularly to the foot or bottom face when on the external support surface, and is moved to a closed position in horizontal alignment parallel to the foot or bottom face when resting on the external support surface to close the brewing unit for extraction of the ingredient within the unit.

16. The machine of claim 15, wherein the casing comprises at least one panel that is detachably mounted onto the main body or to further parts of the casing by connection means arranged to be accessible and connectable and disconnectable by a user to remove and substitute the panel by another compatible panel.

17. The machine of claim 16, wherein the casing comprises at least one side panel that has a horizontally extending member for supporting accessories.

18. The machine of claim 16, in combination with a plurality of separate different compatible panels for substituting for the detachable panel of the outermost casing.

19. The machine of claim 15, wherein the main body includes one or more removable parts, including a drip tray, a liquid receptacle, a used ingredient receptacle or an ingredient supply device, with the removable part(s) either being secured in the body or the body having such an orientation during lifting and displacing that all the removable parts remain safely in place relative to the body when such machine is displaced.

20. The machine of claim 1, wherein the handle is pivotably movable relative to the main body to: a first position to open the brewing unit for introduction or removal of the ingredient into and from the unit; a second position to close the brewing unit for extraction of the ingredient within the unit; and the carrying position for carrying the machine.

\* \* \* \* \*